United States Patent
Van Zoeren et al.

(10) Patent No.: US 9,645,929 B2
(45) Date of Patent: May 9, 2017

(54) SPECULATIVE PERMISSION ACQUISITION FOR SHARED MEMORY

(75) Inventors: James Van Zoeren, Albuquerque, AZ (US); Alexander Klaiber, Mountain View, CA (US); Guillermo J. Rozas, Los Gatos, CA (US); Paul Serris, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 99 days.

(21) Appl. No.: 13/620,070

(22) Filed: Sep. 14, 2012

(65) Prior Publication Data

US 2014/0082291 A1    Mar. 20, 2014

(51) Int. Cl.
*G06F 12/00* (2006.01)
*G06F 12/0831* (2016.01)

(52) U.S. Cl.
CPC .. *G06F 12/0831* (2013.01); *G06F 2212/1024* (2013.01)

(58) Field of Classification Search
CPC .............. G06F 12/0802; G06F 3/0637; G06F 12/0804; G06F 12/0811; G06F 12/084
See application file for complete search history.

(56) References Cited

U.S. PATENT DOCUMENTS

| | | | |
|---|---|---|---|
| 5,487,146 A | 1/1996 | Guttag et al. | |
| 5,721,855 A | 2/1998 | Hinton et al. | |
| 5,870,582 A | 2/1999 | Cheong et al. | |
| 5,956,753 A | 9/1999 | Glew et al. | |
| 6,519,694 B2 | 2/2003 | Harris | |
| 7,010,648 B2 | 3/2006 | Kadambi et al. | |
| 7,062,631 B1* | 6/2006 | Klaiber et al. | 711/207 |
| 7,117,330 B1 | 10/2006 | Alverson et al. | |
| 7,194,604 B2 | 3/2007 | Bigelow et al. | |
| 7,421,567 B2 | 9/2008 | Eickemeyer | |
| 7,752,627 B2 | 7/2010 | Jones et al. | |
| 7,873,793 B1* | 1/2011 | Rozas et al. | 711/144 |
| 7,890,735 B2 | 2/2011 | Tran | |
| 8,035,648 B1 | 10/2011 | Wloka et al. | |
| 2003/0018685 A1 | 1/2003 | Kalafatis et al. | |
| 2004/0128448 A1 | 7/2004 | Stark et al. | |

(Continued)

FOREIGN PATENT DOCUMENTS

| | | |
|---|---|---|
| EP | 0671718 | 9/1995 |
| GB | 2287111 | 9/1995 |

(Continued)

OTHER PUBLICATIONS

Nvidia Corp, Akquirierung spekulativer Genehmigung für gemeinsam genutzten Speicher, Mar. 20, 2014, DE102013218370 A1, German Patent Office, All Pages.*

(Continued)

Primary Examiner — Reginald Bragdon
Assistant Examiner — Hannah A Faye-Joyner

(57) ABSTRACT

In a processor, a method for speculative permission acquisition for access to a shared memory. The method includes receiving a store from a processor core to modify a shared cache line, and in response to receiving the store, marking the cache line as speculative. The cache line is then modified in accordance with the store. Upon receiving a modification permission, the modified cache line is subsequently committed.

20 Claims, 6 Drawing Sheets

(56) References Cited

U.S. PATENT DOCUMENTS

| | | |
|---|---|---|
| 2005/0055533 A1 | 3/2005 | Kadambi et al. |
| 2005/0138332 A1 | 6/2005 | Kottapalli et al. |
| 2005/0154831 A1* | 7/2005 | Steely et al. ............... 711/130 |
| 2006/0010309 A1 | 1/2006 | Chaudhry et al. |
| 2006/0095678 A1 | 5/2006 | Bigelow et al. |
| 2006/0149931 A1 | 7/2006 | Haitham et al. |
| 2006/0174228 A1 | 8/2006 | Radhakrishnan et al. |
| 2006/0277398 A1 | 12/2006 | Akkary et al. |
| 2007/0204137 A1 | 8/2007 | Tran |
| 2009/0019317 A1 | 1/2009 | Quach et al. |
| 2009/0327661 A1 | 12/2009 | Sperber et al. |
| 2010/0205402 A1 | 8/2010 | Henry et al. |
| 2010/0205415 A1 | 8/2010 | Henry et al. |
| 2012/0023359 A1 | 1/2012 | Edmeades et al. |
| 2012/0089819 A1 | 4/2012 | Chaudhry et al. |
| 2014/0082291 A1 | 3/2014 | Van Zoeren et al. |
| 2014/0136891 A1 | 5/2014 | Holmer et al. |
| 2014/0281259 A1 | 9/2014 | Klaiber et al. |
| 2015/0026443 A1 | 1/2015 | Kumar et al. |

FOREIGN PATENT DOCUMENTS

| | | |
|---|---|---|
| TW | 1263938 | 10/2006 |
| TW | I275938 | 3/2007 |
| TW | 200723111 | 6/2007 |
| TW | 200809514 | 2/2008 |
| TW | 1315488 | 10/2009 |
| TW | 1425418 | 2/2014 |

OTHER PUBLICATIONS

Dehnert et al., The Transmeta Code Morphing™ Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.*

Adve, S. et al., "Shared Memory Consistency models: A Turorial", WRL Research Report 95/7, Western Digital Laboratory, Sep. 1995, 32 pages.

Chaudry, S. et al., "High-Performance Throughput Computing," Micro, IEEE 25.3, pp. 32-45, May 2005, 14 pages.

Dundas, J. et al., "Improving Date Cache Performance by Pre-executing Instructions Under a Cache Miss", Proceedings of the 1997 International Conference on Supercomputing, Jul. 1997, 9 pages.

Ekman, M. et al., "Instruction Categorization for Runahead Operation", U.S. Appl. No. 13/708,544, filed Dec. 7, 2012, 32 Pages.

Ekman, M. et al., "Selective Poisoning of Data During Runahead", U.S. Appl. No. 13/662,171, filed Oct. 26, 2012, 33 pages.

Holmer, B., et al., "Managing Potentially Invalid Results During Runahead", U.S. Appl. No. 13/677,085, filed Nov. 14, 2012, 29 pages.

Mutlu, O. et al. "Runahead Execution: An Alternative to Very large Instruction Windows for Out-of-order Processors," This paper appears in: "High-Performance Computer Architecture," Feb. 8-12, 2003, 13 pages.

Rozas, J. et al., "Lazy Runahead Operation for a Microprocessor", U.S. Appl. No. 13/708,645, filed Dec. 7, 2012, 32 pages.

Rozas, Guillermo J. et al., "Queued Instruction Re-Dispatch After Runahead," U.S. Appl. No. 13/730,407, filed Dec. 28, 2012, 36 pages.

Wikipedia Article, "Instruction Prefetch", https://en.wikipedia.org/wiki/instruction_prefetch, download May 23, 2016.

Wikipedia Article, "x86", https://en.wikipedia.org/wiki/X86, downloaded May 23, 2016.

Intel Itanium Architecture Software Developer's Manual, Intel, http://www.intel.com/design/itanium/manuals/iiasdmanual.htm, 1 page. Mar. 8, 2013.

* cited by examiner

|  | Cache A MESI | Cache A transactional | Cache B MESI | Cache B transactional |
|---|---|---|---|---|
| Starting point | Shared |  | Shared |  |
| Store completes in A | Modified | Spec* | Shared |  |
| Snoop completes in B | Modified | Spec* | Invalid |  |
| Response received in A | Modified | Spec | Invalid |  |
| Commitment in A | Modified |  | Invalid |  |

\* designates times when commits are not allowed

FIG. 3

Example of two upgrades at same time

| | Cache A MESI | Cache A transactional | Cache B MESI | Cache B transactional |
|---|---|---|---|---|
| Starting point | Shared | | Shared | |
| Store completes in B | Shared | | Modified | Spec* |
| Store completes in A | Modified | Spec* | Modified | Spec* |
| Snoop from A causes rollback in B | Modified | Spec* | Invalid | |
| Response received in A | Modified | Spec | Invalid | |
| Commitment | Modified | | Invalid | |
| Snoop from B causes eviction in A | Invalid | | Invalid | |
| Response received in B | Invalid | | Invalid | |

* designates times when commits are not allowed

FIG. 4

SPECULATIVE PERMISSION ACQUISITION FOR SHARED MEMORY

FIELD OF THE INVENTION

The present invention is generally related to computer systems.

BACKGROUND OF THE INVENTION

Processors often use a MESI state coherency mechanism for multiprocessor caching, where every line in the cache is marked either Modified, Exclusive, Shared, or Invalid. A shared line can be converted to Exclusive or Modified (when a store wants to retire to a shared line, for example) only after first sending a snoop to other caches that converts all other possible shared lines in peer caches to Invalid, and then finally allowing the line to be upgraded to Exclusive. The possible state combinations are tracked and implemented in accordance with the MESI state coherency mechanism.

The problem with a conventional system, however, when a store hits a shared cache line, the system has two choices. It can either wait for all snoops to complete before allowing the store to complete, which reduces the parallelism of the machine, or it can evict the shared line, then complete the store to an invalid line. This allows more parallelism, because the processor can continue to execute other code, but does not allow any later loads to see the data contained in the line. It also adds latency to perform the eviction.

SUMMARY OF THE INVENTION

Embodiments of the present invention utilize a speculative caching mechanism whereby all cache lines are marked with a MESI state (e.g., Modified, Exclusive, Shared, or Invalid), but are also marked with a plurality of additional bits referring to the speculative transactional state of the line. This allows each transaction to be atomically committed (e.g., all recorded at once) or rolled back (e.g., all changes discarded).

In one embodiment, the present invention comprises a computer implemented method for speculative permission acquisition for access to a shared memory. The method includes receiving a store from a processor core to modify a shared cache line, and in response to receiving the store, marking the cache line as speculative. The cache line is then modified in accordance with the store. Upon receiving a modification permission, the modified cache line can be subsequently committed.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 3 illustrates a cache line upgrading process in accordance with one embodiment of the present invention.

FIG. 4 illustrates a cache line upgrading process where two upgrades proceed at the same time in accordance with one embodiment of the present invention.

DETAILED DESCRIPTION OF THE INVENTION

Figure 1:
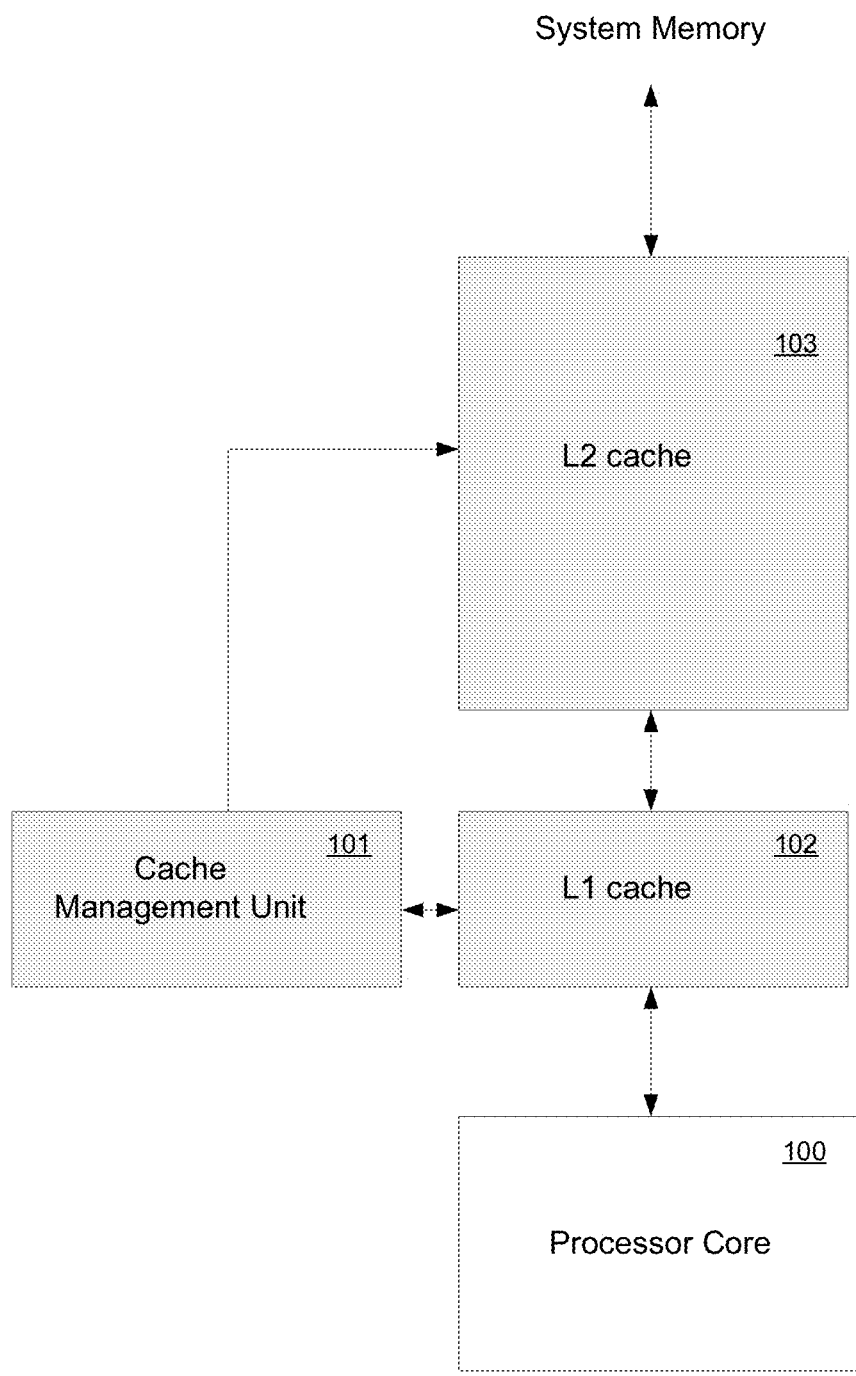
FIG. 1 shows a diagram of a cache management unit in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of non-transitory electrical or magnetic signals capable of being stored, transferred, combined, compared, and otherwise manipulated in a computer readable storage medium of a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 shows a diagram of a cache management unit in accordance with one embodiment of the present invention. As shown in FIG. 1, a cache management unit 101 is coupled to in L1 cache 102 and an L2 cache 103. The L1 cache is coupled to the processor core 102 communicatively exchange instructions and data comprising the cache lines.

Embodiments of the present invention utilize a speculative caching mechanism whereby all cache lines are marked with a MESI state (e.g., Modified, Exclusive, Shared, or Invalid), but are also marked with a plurality of additional bits referring to the speculative transactional state of the line. This allows each transaction to be atomically committed (e.g., all recorded at once) or rolled back (e.g., all changes discarded).

Figure 2:
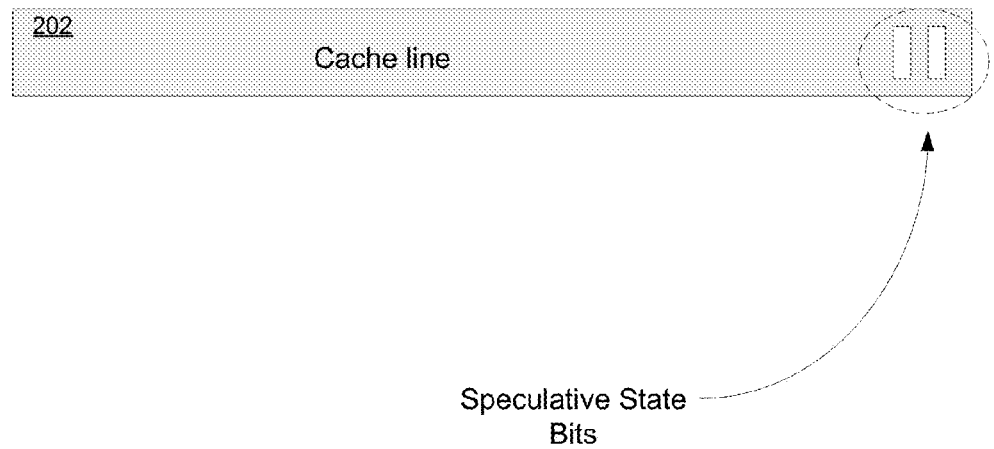
FIG. 2 shows a cache line and a plurality of specular state bits in accordance with one embodiment of the present invention.

FIG. 2 shows a cache line 202 and a plurality of specular state bits in accordance with one embodiment of the present invention. In one embodiment, this speculative transactional behavior of the caches is implemented by adding a speculative bit, meaning that the line has been modified in the current transaction, and an observed bit, meaning that the line has been read in the current transaction, to the cache lines. The speculative state bits (e.g., Speculative and Observed bits) are cleared upon commitment or rollback, but Speculative lines are also converted from Modified to Invalid upon rollback. Any modified data that precedes the transaction must be written back to an outer-level cache as a versioned line. Thus as long as both Speculative and Observed lines stay in the cache until the end of the transaction, the transaction will be seen atomically by the viewpoint of the system, or of other processors in the system.

For example, when a transactional store misses (e.g., or hits an Invalid line), the speculative state bits help ensure that the transaction is not committed until exclusive permissions have been acquired for the line by completing snoops to any other caches that may contain the line. This can be done by having a small number of state machines or special cache lines that mark the line as exclusive but not visible to snoops. These state machines keep track of the line until all snoops to other caches complete, and then mark the line as now visible to snoops.

Therefore, such an embodiment is consistent with the common MESI rule that if any cache has a line as Modified or Exclusive, then all other peer caches must have the line as Invalid. However, in accordance with embodiments of the present invention, when a line is Modified or Exclusive and not visible to snoops, the processor is effectively computing the state that the line will be in at the end of the transaction, rather than actually marking the line as Modified or Exclusive in the full MESI protocol.

For example, when a snoop hits an Observed or Speculative line that is visible to snoops, the current transaction for that processor must either be committed or be rolled back before the snoop can complete. In general, this means that snoops cause rollbacks when they hit Observed or Speculative lines.

A speculative caching mechanism in accordance with embodiments of the present invention is advantageously able to avoid limitations of a conventional system. For example, when a transactional store hits a Shared line, the conventional system had two choices: 1. Wait for all snoops to complete before allowing the store to complete, which reduces the parallelism of the machine. 2. Evict the Shared line, then complete the store to an Invalid line. This allows more parallelism, because the processor can continue to execute other code, but does not allow any later loads to see the data contained in the line. It also adds latency to perform the eviction.

A speculative caching mechanism in accordance with embodiments of the present invention provides a number of benefits. The addition of such upgrade state machines provides the functionality.

1. Permissions acquisitions can be overlapped for multiple stores that missed or hit shared lines by allowing the machine to keep completing code until the next transactional boundary. This gives us the best performance by not waiting for permissions requests serially. We also can send out load misses, or start other long-latency operations, without first waiting for all snoops. In addition, because of our processor's run-ahead mode, we can even look past the transaction boundary in order to uncover and send more miss requests to outer caches.

2. Instead of keeping an extra bit for every cache line, a small number of state machines can be maintained that keep track of the addresses that are currently being upgraded. These state machines do not need to keep track of where the line resides within the caching system, which reduces storage needs and means that the upgrade state machines do not need to interlock with other eviction state machines or other machinery that may be moving cache lines. In addition, once an upgrade request has been sent to the outer memory system, there is no longer any need to keep track of the address. This allows an enhancement by having two sets of state machines: one that holds addresses, the other just waiting for responses to requests already sent. The latter set of state machines need a very small amount of storage, shrinking the number of state elements significantly when compared to an upgrade-bit-per-cache line implementation.

3. A store that hits a shared line may be hitting a line with an already outstanding request. Because requests could return exclusive permissions or not, the state machine design allows for waiting for the existing request to complete before making any additional request, which simplifies the request protocol between caches and reduces redundant requests, improving performance.

4. The state machines each ensure that the current transaction does not complete without requiring a logical OR operation across all upgrade bits of the entire cache. Because it is very difficult to implement an OR operation across many bits, the state machine solution does not require overly difficult mechanisms, such as, for example, a difficult implementation or some kind of other machinery that would move upgraded lines into a special holding buffer, which would add latency.

5. An inclusive outer cache design may not actually need to acquire permissions in all cases before sending a response to one of these upgrade requests. If the outer cache knows that the line is no longer present in the inner cache, then it can respond immediately. The inner processor has already rolled back its transaction and marked the upgraded line invalid, so the response does not do anything harmful. In cases where processors are contending for a line and having trouble making forward progress with their speculative transactions, this could help performance noticeably. These, and the other above described benefits are diagrammed in example operations described by FIG. 3 and FIG. 4 below.

FIG. 3 illustrates a cache line upgrading process in accordance with one embodiment of the present invention.

As depicted in FIG. 3, two shared caches are illustrated, cache A and cache B. The respective cache MESI and cache transactional are also shown. FIG. 3 illustrates that as a transaction is committed, the upgrade allows the store to execute by marking the cache line as speculative. The "*" designates times during the transaction when commits are not allowed.

FIG. 4 illustrates a cache line upgrading process where two upgrades proceed at the same time in accordance with one embodiment of the present invention. As depicted in FIG. 4, two shared caches are illustrated, cache A and cache B. The respective cache MESI and cache transactional are also shown. Two upgrades are shown as they complete the transaction. As with FIG. 3, FIG. 4 illustrates that as a transaction is committed, the upgrade allows the store to execute by marking the cache line as speculative.

Figure 5:
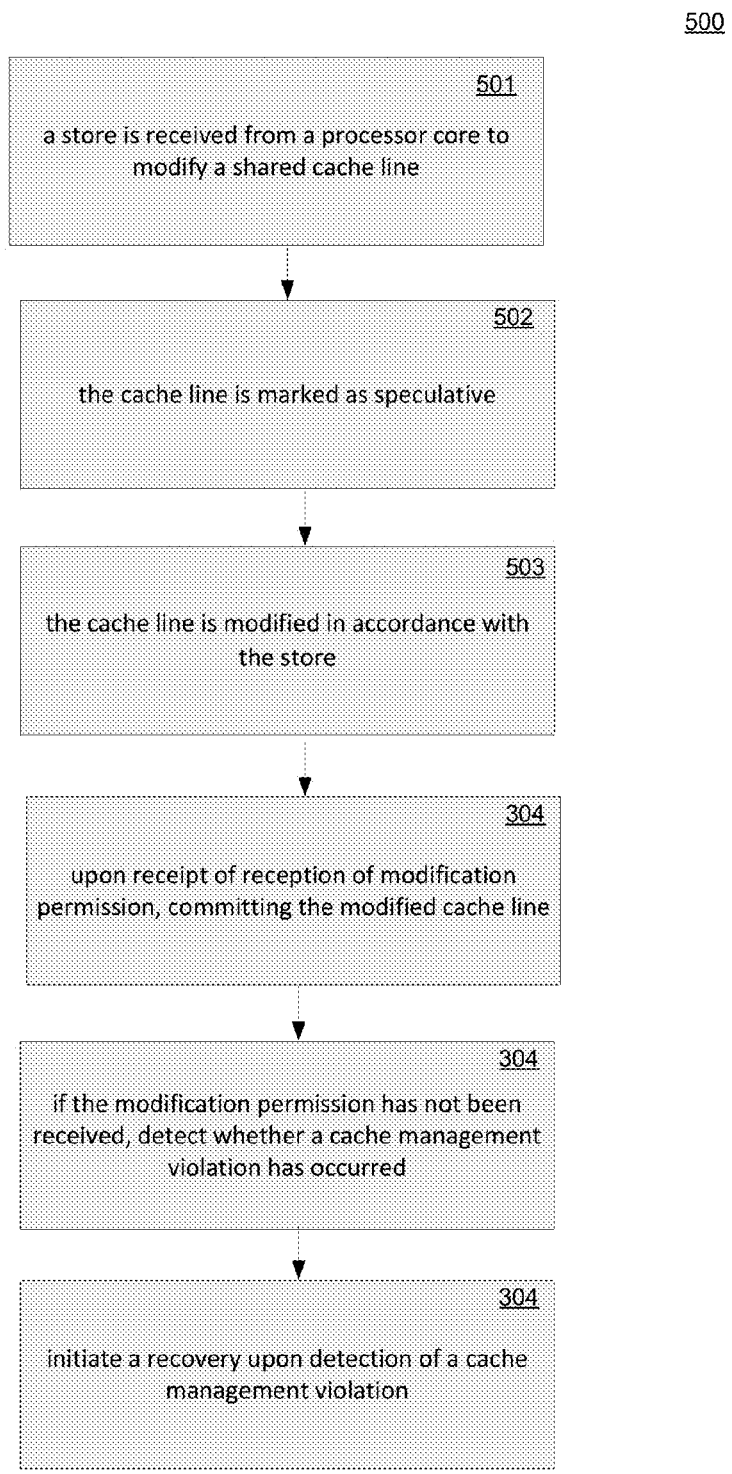
FIG. 5 shows a flowchart of a speculative permissions acquisition process in accordance with one embodiment of the present invention.

FIG. 5 shows a flowchart of a speculative permissions acquisition process in accordance with one embodiment of the present invention. As shown in FIG. 5, process 500 shows the overview steps of speculative permissions acquisition process for the acquiring permissions to modify cache lines.

Process 500 begins in step 501, where a store is received from a processor core to modify a shared cache line. In step 502, the cache line is marked as speculative. In step 503, the cache line is modified in accordance with the store. In step 504, upon receipt of reception of modification permission, committing the modified cache line. In step 505, if the modification permission has not been received, detect whether a cache management violation has occurred. Such a cache management violation can be, for example, a MESI violation. In step 506, process 500 initiates a recovery upon detection of a cache management violation.

Figure 6:
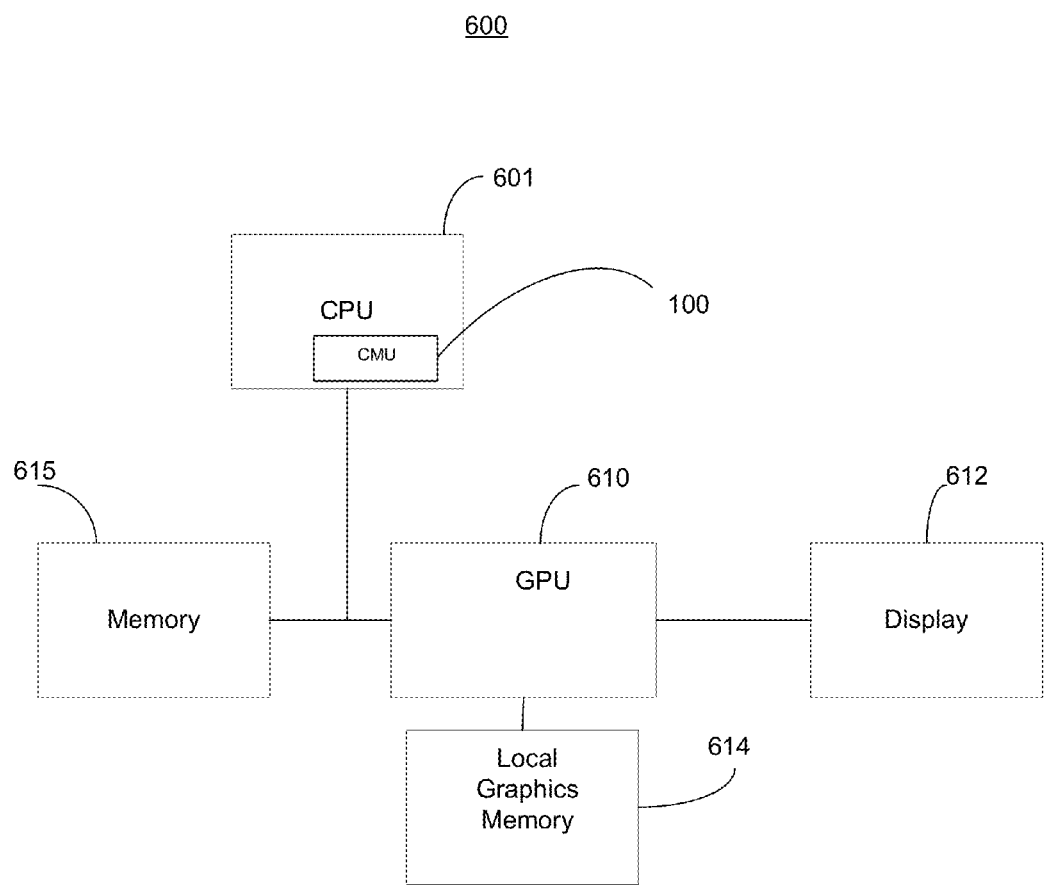
FIG. 6 shows a computer system in accordance with one embodiment of the present invention.

Computer System Platform:

FIG. 6 shows a computer system 600 in accordance with one embodiment of the present invention. Computer system 600 depicts the components of a basic computer system in accordance with embodiments of the present invention providing the execution platform for certain hardware-based and software-based functionality. In general, computer system 600 comprises at least one CPU 601, a system memory 615, and at least one graphics processor unit (GPU) 610. The CPU 601 can be coupled to the system memory 615 via a bridge component/memory controller (not shown) or can be directly coupled to the system memory 615 via a memory controller (not shown) internal to the CPU 601. The GPU 610 is coupled to a display 612. The GPU 610 is shown including an allocation/de-allocation component 620 for just-in-time register allocation for a multithreaded processor. A register file 627 and an exemplary one of the plurality of registers (e.g., register 625) comprising the register file is also shown within the GPU 610. One or more additional GPUs can optionally be coupled to system 600 to further increase its computational power. The GPU(s) 610 is coupled to the CPU 601 and the system memory 615. System 600 can be implemented as, for example, a desktop computer system or server computer system, having a powerful general-purpose CPU 601 coupled to a dedicated graphics rendering GPU 610. In such an embodiment, components can be included that add peripheral buses, specialized graphics memory, 10 devices, and the like. Similarly, system 600 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 610 can be implemented as a discrete component, a discrete graphics card designed to couple to the computer system 600 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 614 can be included for the GPU 610 for high bandwidth graphics data storage.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method, performed by a processor, for speculative permission acquisition for access to a shared memory, the method comprising:
   receiving a store from a processor core to modify a first cache line in a first cache, wherein the first cache line in the first cache and a second cache line in a second cache are in a shared state and comprise a same data content;
   in response to receiving the store, marking the first cache line as speculative;
   modifying the first cache line in accordance with the store; and
   upon receiving a modification permission that is determined based on a current state of the second cache line in the second cache, committing the store in the first cache line in the first cache.

2. The method of claim 1 further comprising, if the modification permission has not been received, by using a cache management unit, detecting whether a cache management violation has occurred; initiating a recovery upon a detection of the cache management violation; and rejecting committing the store in the first cache line.

3. The method of claim 2, wherein the cache management violation refers to the current state of the second cache line being a modified state.

4. The method of claim 1, wherein the modification permission is issued if the current state of the second cache line indicates that the second cache line is invalid.

5. The method of claim 1, wherein a plurality of speculative state bits are appended to the first cache line to track a speculative state.

6. The method of claim 1, wherein the first cache line and the second cache line are maintained in accordance with a MESI (modified, exclusive, shared, or invalid) protocol.

7. The method of claim 1, wherein modifying the first cache line comprises: monitoring snoops to the first cache line by using a state machine; and delaying commitment until the modification permission is received.

8. A non-transitory computer readable storage medium having stored thereon, computer executable instructions that, if executed by a computer system cause the computer system to perform a method for speculative permission acquisition for access to a shared memory, the method comprising:

receiving a store from a processor core to modify a first cache line in a first cache, wherein the first cache line in the first cache and a second cache line in a second cache are in a shared state and comprise a same data content;

in response to receiving the store, marking the first cache line as speculative;

modifying the first cache line in accordance with the store; and upon receiving a modification permission that is determined based on a current state of the second cache line in the second cache, committing the store in the first cache line in the first cache.

9. The non-transitory computer readable storage medium of claim 8, wherein the method further comprises, if the modification permission has not been received, by using a cache management unit, determining whether a cache management violation has occurred; initiating a recovery upon detection of the cache management violation; and rejecting committing the store in the first cache line.

10. The non-transitory computer readable storage medium of claim 9, wherein the modification permission is issued if the current state of the second cache line indicates that said second cache line is invalid.

11. The non-transitory computer readable storage medium of claim 8, wherein the cache management violation refers to the current state of the second cache line being a modified state.

12. The non-transitory computer readable storage medium of claim 8, wherein a plurality of speculative state bits are appended to the first cache line to track a speculative state.

13. The non-transitory computer readable storage medium of claim 8, wherein the first cache line is maintained in accordance with a MESI (modified, exclusive, shared, or invalid) protocol.

14. The non-transitory computer readable storage medium of claim 8, wherein modifying the first cache line comprises: monitoring snoops to the first cache line by using a state machine; and delaying commitment until the modification permission is received.

15. A computer system, comprising:

a processor coupled to a non-transitory computer readable storage media and executing computer readable code which causes the computer system to:

receive a store from a processor core to modify a first cache line in a first cache, wherein the first cache line in the first cache and a second cache line in a second cache are in a shared state and comprise a same data content;

in response to receiving the store, mark the first cache line as speculative;

modify the first cache line in accordance with the store; and upon receiving a modification permission that is determined based on a current state of the second cache line in the second cache, commit the store in the first cache line in the first cache.

16. The computer system of claim 15, wherein, if the modification permission has not been received, the computer system is configured to determine whether a cache management violation has occurred; initiate a recovery upon detection of a cache management violation; and reject committing the store in the first cache line.

17. The computer system of claim 16, wherein the modification permission is issued if the current state of the second cache line indicates the second cache line is invalid.

18. The computer system of claim 15, wherein the cache management violation refers to the current state of the second cache line being a modified state.

19. The computer system of claim 15, wherein a plurality of speculative state bits are appended to the shared cache line to track a speculative state.

20. The computer system of claim 15, wherein the first cache line is maintained in accordance with a MESI (modified, exclusive, shared, or invalid) protocol.

* * * * *